United States Patent [19]
Oles

[11] Patent Number: 5,946,500
[45] Date of Patent: Aug. 31, 1999

[54] APPARATUS AND METHOD FOR CHROMA REPLACEMENT

[76] Inventor: Henry J. Oles, P.O. Box 78, San Marcos, Tex. 78667

[21] Appl. No.: 08/933,432

[22] Filed: Sep. 18, 1997

[51] Int. Cl.[6] .............................. G03B 15/00; G03B 15/06
[52] U.S. Cl. .................................. 396/3; 396/4; 396/544; 352/48; 352/88
[58] Field of Search .............................. 396/1, 3, 4, 544, 396/429; 352/48, 49, 88, 89; 353/28; 348/722; 359/459

[56] References Cited

U.S. PATENT DOCUMENTS

| | | | |
|---|---|---|---|
| 1,673,019 | 6/1928 | Pomeroy | 396/3 |
| 2,727,427 | 12/1955 | Jenkins | 396/3 |
| 3,227,509 | 1/1966 | Baker . | |
| 3,322,487 | 5/1967 | Renner | 396/3 |
| 3,911,450 | 10/1975 | Schwartz . | |
| 4,067,026 | 1/1978 | Pappanikolaou . | |
| 4,183,644 | 1/1980 | Tureck et al. | 396/3 |
| 4,527,872 | 7/1985 | Gentleman et al. | 352/89 |
| 4,533,224 | 8/1985 | Ou | 396/3 |
| 4,738,526 | 4/1988 | Larish | 396/3 |
| 4,796,990 | 1/1989 | Crothers et al. | 352/89 |
| 4,843,410 | 6/1989 | Kallenberg | 396/3 |
| 4,847,645 | 7/1989 | Kallenberg et al. | 396/3 |
| 5,469,295 | 11/1995 | Burke . | |
| 5,483,308 | 1/1996 | Youngker et al. . | |
| 5,508,764 | 4/1996 | Oles et al. . | |

*Primary Examiner*—Alan A. Mathews
*Attorney, Agent, or Firm*—Strasburger & Price, LLP; Matthew J. Booth

[57] ABSTRACT

The present invention is a method and apparatus for background generation and chroma replacement for use with video and digital imaging that includes motion pictures, television, commercial and portrait photography. The present invention comprises a projection device that generates and projects a background image where the projection device further comprises a front projecting device and a retroreflective screen. The front projection device couples to a camera and comprises a projector with a removeable filter coupled to a beamsplitter enclosure. The beamsplitter enclosure comprises a beamsplitter with a quick connect coupling. A sizing ring couples the quick connect coupling to the camera lens. The removable filter in the projector may comprise a solid colored filter or a photographic image.

14 Claims, 3 Drawing Sheets

APPARATUS AND METHOD FOR CHROMA REPLACEMENT

BACKGROUND OF THE INVENTION

1. Field of the Invention

This invention relates generally to background generation in video photography. More specifically, this invention relates to chroma replacement technology in background removal and subsequent replacement with video and digital imaging.

2. Description of the Related Art

The ability to replace a scene's background allows the television and film industries the freedom to create scenes not otherwise possible, whether due to the actual background's location or the prohibitive expense associated with creating the desired background. By using chroma replacement technology, however, it is possible to generate a wide variety of backgrounds in the studio. This technology allows a photographer to shoot scenes in front of a solid colored background, digitally remove the background from the film, and replace it with a new background image. This technology is found in motion pictures, videos, and select novelty type portraiture (heads on different bodies, etc.), but has not typically been useful in the creation of high quality professional portrait or commercial prints.

FIGS. 1A and 1B illustrate a typical approach to background replacement in the prior art. The chroma replacement (also known as blue or green screen or chroma keying) approach to creating backgrounds for video, commercial, and digital imaging involves placing a colored background 10 behind a subject 12, where the background is typically a blue or green colored paper. Multiple flood lamps 14 generally illuminate the colored background 10 from several directions. After taking the picture of the subject using film studio cameras 16, technicians separate the resulting film image to electronically remove the colored background and replace it with a pre-selected image. The modified image is suitable for printing with a digital printer or is reconverted to a negative using a film recorder and printed with traditional negative printing techniques. In video photography, such as television, the replacement process typically occurs in real time by using an electronic filter to remove on the fly the background color and either simultaneously or downstream merge a new background into the viewing image.

The limitations associated with the current chroma replacement procedure in film and video photography are numerous. For example, the colored background image may have significant uneven illumination unless precise proper positioning of numerous flood lamps occurs. The uneven illumination makes it difficult to electronically remove the background color before replacing it with the desired background image due to the large bandwidth of the color to be replaced. An additional problem is that the flood light illumination on the green or blue background often results in a large amount of color distortion on the subject caused by the intense colored light reflecting from the background onto the subject.

Another limitation with chroma replacement technology in film and video photography is that the subject may cast shadows onto the background screen that become distractions to the viewer. The shadows cast onto the background intensify as the subject stands closer to the background and make it more difficult to successfully remove the background. An example of this occurs in television when the weatherman stands close to the background being electronically converted into the weather map and his shadow is visible on the background.

The commercial still photography industry does not typically use chroma replacement due to several limitations in the technology. One important limitation is that the color of the background limits the colors used in the foreground of the picture. If the subject wears or holds anything of similar color to the background color, the chroma replacement process will replace both the background colored image and the similarly colored item. It is therefore necessary to broadly avoid colors in the foreground that have even a similar color to the background color. For example, if using a blue screen background, the subject cannot wear any shade of a blue shirt or a blue tie. Similarly, if the photographer uses a green screen, green plants cannot be in the scene's foreground. In television, the subject is often told in advance what colors to wear to avoid this problem of having a color similar to the color of the background. However, this is a common problem in a photography studio where the photographer has no advance warning and little control over the colors the unaware subject chooses to wear to the studio.

Since chroma replacement has not been a viable option for commercial still photography, still photographers typically use composite photography instead. In composite photography, a projector projects an image at a blank screen behind the subject. In this manner, a different background can be created within the studio. The front projection process traditionally used to create composite photographs in still photography has many limitations in its use. A front projection device typically comprises a large heavy projector with an attached beamsplitter that mounts to a tripod or stand. A camera then securely mounts to the front projection device (on the stand) and can be brought into alignment with the front projection device by raising and lowering the device in relation to the camera by adjusting the tilt of the beamsplitter and the pivot of the camera. This process often leaves fringe shadowing around the subject since the adjustments are rarely done with enough precision to achieve perfect alignment. Additionally, if the photographer wants to change the camera from a vertical to a horizontal format or vice versa, it is necessary to spin the camera on the mounting blocks (of the stand) while the front projection device remains stationary. Changing the camera causes the camera to go out of alignment with the front projection device, which means that the photographer must precisely realign the camera with the front projection device.

The present invention involves a novel application of the front projection process to the chroma replacement technology for the film and television industries that solves many of the problems currently associated with the replacement technology. The present invention comprises a retroreflective background screen and a unique lightweight projector and beamsplitter combination that forms a front projection device. This front projection device quickly attaches to any camera of any size and automatically aligns the projection beam with the exact center of the camera lens. The small, simple attachment with its precise positioning makes it a highly unique instrument offering many advantages over prior techniques.

The present invention improves the chroma replacement process in film and video photography by eliminating the need for a specific colored background and flood light illumination of the background. Eliminating the flood lamps solves problems such as uneven illumination of the background, color contamination of the subject caused by reflection of the colored light from the background onto the subject, and shadowing from the subject on the background. Elimination of these problems allows the subject to be positioned as close as wanted to the background. With the present invention, the subject will not cast visible shadows onto the background screen regardless of how close to the background the subject stands because the subject's body precisely fits within its shadow, making the shadow invisible to the camera.

The present invention also eliminates the need for multiple backgrounds of different colors to be kept by a film, television, or commercial photography studio. With a retroreflective screen, the background can take on any conceivable color simply by inserting a different colored filter into the present invention. By changing the colored filter, the color of the background quickly switches to a color maximally compatible with the chroma replacement process. Thus, a background of any number of colors is available with only one screen required.

The present invention additionally improves the current front projection process used in commercial photography. To begin with, the automatic alignment feature of the invention eliminates the time consuming adjustment of the camera, beamsplitter and projector previously required in the front projection process. This feature eliminates fringe shadows around the subject and creates maximum color saturation in the background. Also, as the photographer shifts the camera's orientation from horizontal to vertical or vice versa, the present invention turns precisely on the camera lens and maintains perfect alignment with the projector.

SUMMARY OF THE INVENTION

The present invention is a method and apparatus for background generation and chroma replacement for use with video and digital imaging that includes motion pictures and television. The present invention comprises a front projection device and a retroreflective screen. The front projection device comprises a projector with a removable color filter coupled to a beamsplitter. A background image from the projector passes through the removable filter. The beamsplitter then redirects the background image to the retroreflective screen. Replacing the filter within the projector with a single colored filter causes the screen to become a perfectly even colored background when viewed through the camera. Another embodiment of the present invention provides for the use of projection devices coupled to multiple cameras. Individual cameras and front projection devices can simultaneously project different colored backgrounds onto the retroreflective screen if the same color background would not suffice for multiple subjects. Each camera and front projection device combination uses its own respective selected color.

Another embodiment of the present invention comprises a front projection device that couples to a camera lens and projects a background image on a retroreflective screen. The front projection device comprises a projector with a removable filter coupled to a beamsplitter enclosure. The beamsplitter enclosure further comprises a beamsplitter and a quick connect coupling. A sizing ring couples the camera lens and the quick connect coupling of the beamsplitter. The front projection device can be attached to and removed from any camera while automatically achieving perfect optical alignment.

DETAILED DESCRIPTION OF THE INVENTION

The present invention is a method and apparatus for background generation and chroma replacement for use with video and digital imaging that includes motion pictures and television. Additionally, the present invention is a method and apparatus for providing background generation and chroma replacement with commercial and portrait photography. And finally, the present invention is a method and apparatus for front projection of a background image. This disclosure describes numerous specific details that include specific materials, structures, elements, and processes in order to provide a thorough understanding of the present invention. One skilled in the art, however, will appreciate that one may practice the present invention without these specific details. And finally, this disclosure does not describe some well known processes such as blue screen replacement, video and still photography, and beamsplitting in detail in order not to obscure the present invention.

Figure 1A:
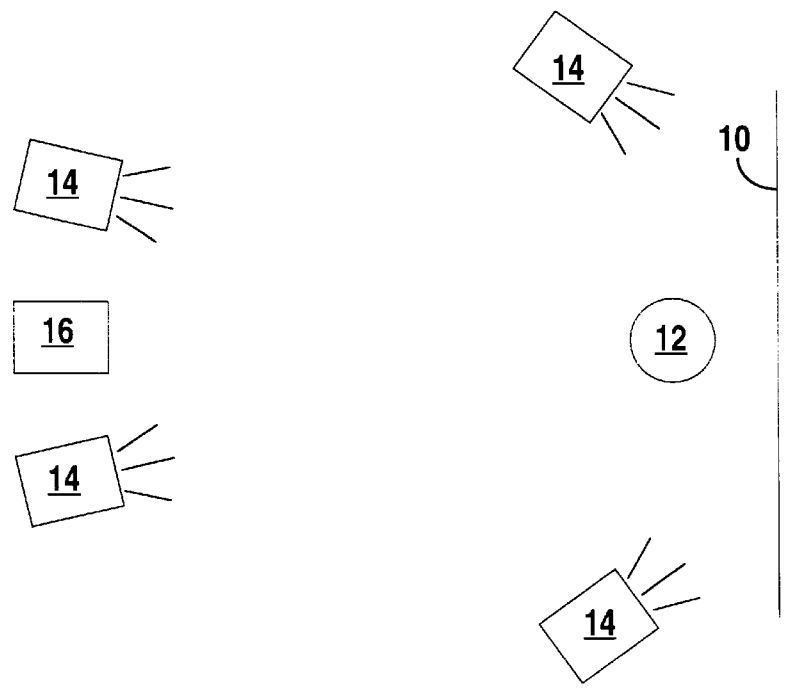
FIGS. 1A and 1B illustrate traditional chroma replacement layout in a studio.
Figure 1B:
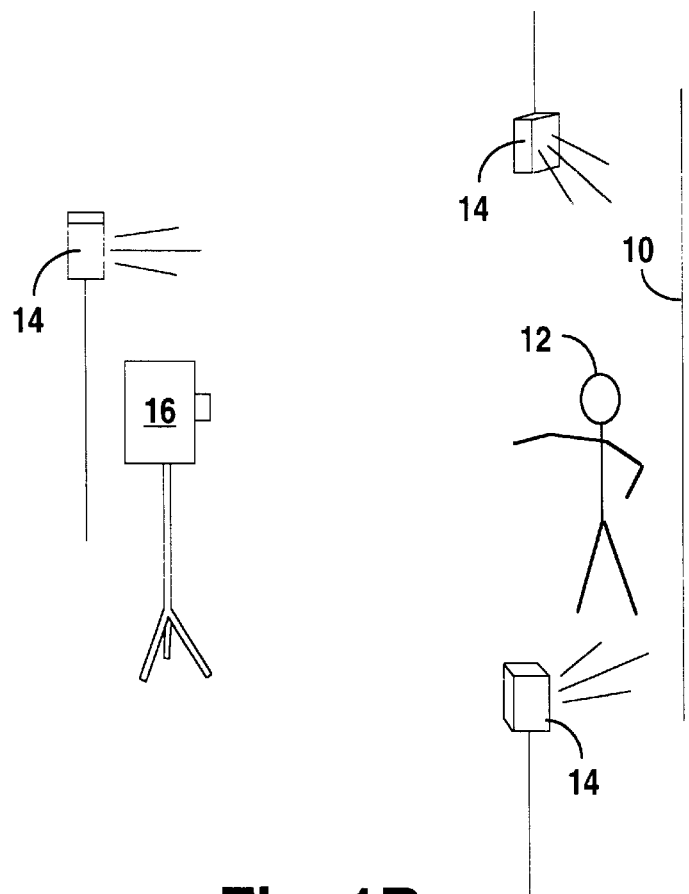

FIGS. 1A (top view) and 1B (side view) illustrate the current technique used with chroma replacement for film and video photography. A subject 12 is in front of a solid color background 10 (traditionally blue or green). The flood lamps 14 provide illumination of both the background 10 and the subject 12. A camera 16 photographs the subject 12 in front of the solid color background 10. During the post processing of the film, a new background image replaces the solid color background. In television such as a weather cast, the replacement process would happen in real time.

Figure 2:
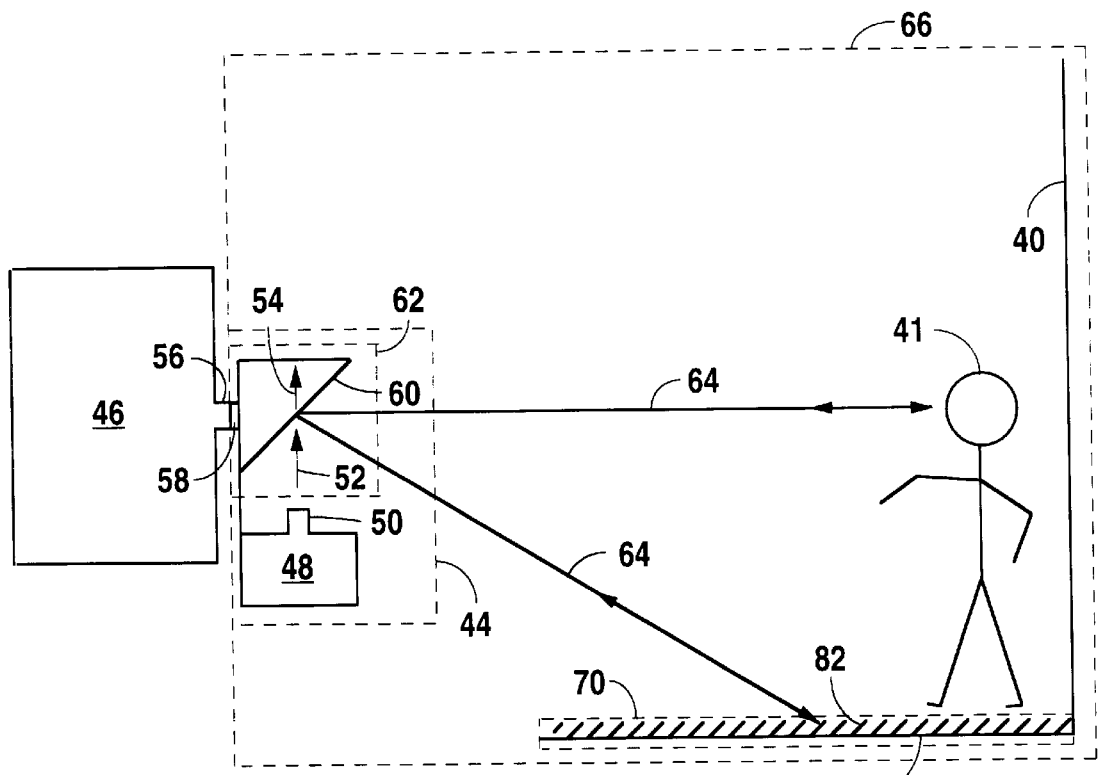
FIG. 2 illustrates the present invention in operation.

FIG. 2 illustrates the present invention as used with video photography such as motion pictures and television. The present invention comprises a projection device 66 that couples to a video camera 46 and generates a background image for chroma replacement. The projection device 66 comprises a front projection device 44 and a retroreflective screen 40 and or 70. The front projection device 44 couples to a lens 56 of camera 46. The coupling of the front projection device to the camera provides the present invention with an automatic alignment of the camera lens 56 such that the reflected light 64 reflects off the retroreflective screens 40 and or 70 and returns along the same optical path to the camera lens 56. The present invention's ability to have a perfect alignment with the camera lens minimizes the fringe shadowing that causes fuzzy edges around a subject and provides greater background detail, even in delicate areas such as the subject's hair.

Figure 3:
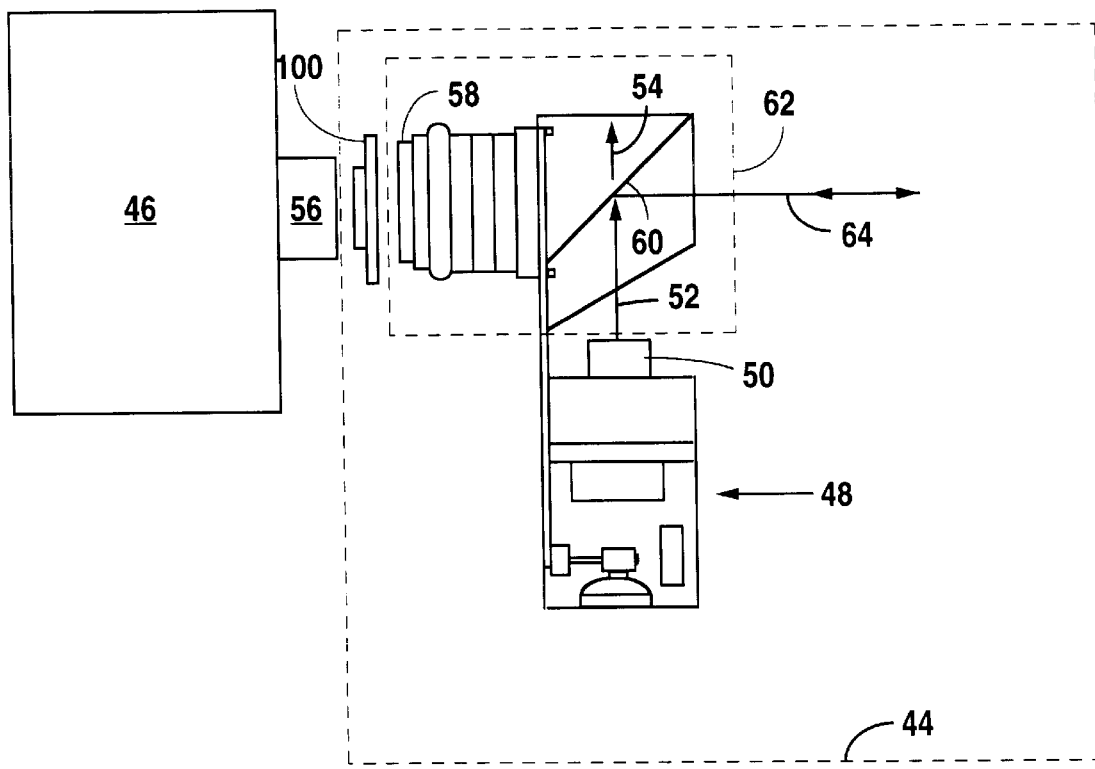
FIG. 3 is a detailed view of the front projection apparatus component of the present invention.

FIG. 3 is a detailed view of the front projection device 44 of the present invention. The front projection device 44 couples to a camera lens 56 much like a lens filter. One of the requirements of the front projection device 44 is that it must be lightweight so a photographer can hold the front projection device 44 coupled to the camera 46 without the benefit of a camera stand or tripod. The front projection device comprises a projector 48 coupled to a beamsplitter enclosure 62. The beamsplitter enclosure 62 further comprises a beamsplitter 60 and a quick connect coupling 58. The front projection device 44 couples to the camera lens 56 using one or more sizing rings 100 and the quick connect coupling 58 of the beamsplitter enclosure 62. Since camera lenses come in various diameters, an appropriate number of step up or step down sizing rings 100 couple to the lens 56 until the quick connect coupling 58 can lock the lens into place. This coupling system enables the front projection device 44 to easily couple to a camera lens of virtually any size, from 35 mm to large studio television cameras.

A lens 50 adjustably couples to the projector 48. The adjustable lens eliminates past problems associated with having to reposition the projector 48 with respect to the beamsplitter 62 and camera 46. Coupled to the projector 48 is a revolving slide or a removable filter holder that enables an operator to quickly change the projected background image 52 by using a different colored filter or even a new background image. This feature of the invention allows a photographer to choose the color of the background after learning what the subject is wearing, rather than dictating to the subject the allowable colors to wear.

The front projection device 44 also comprises a beamsplitter enclosure 62. The beamsplitter enclosure 62 comprises a beamsplitter 60 and a quick connect coupling 58. In the preferred embodiment, the quick connect coupling is a slip ring design that allows the front projection device to maintain its orientation when the camera is rotated from a vertical to horizontal orientation and vice versa. The beamsplitter 60 comprises a semi-transparent or semi-reflecting sheet or mirror placed within the beamsplitter enclosure 62. The preferred embodiment of the present invention uses a 60/40 beamsplitter with part of the intensity of the light 52 (containing the background image) being reflected as the projected light 64 to the retroreflective screen 40 and or 70 and the other part of the light 54 passing through the beamsplitter 60 and being absorbed by the beamsplitter enclosure 62. The light projected 64 reflects off the retroreflective screens 40 and or 70 and travels back along the same optical light path before entering the camera lens 56.

The retroreflective screens 40 and or 70 (FIG. 2) of the preferred embodiment of the present invention comprise SCOTCHLITE, a trademark of the 3M Corporation, as the reflective material on the screen. SCOTCHLITE is approximately 1,500 times brighter than an ordinary white projection screen, and when combined with the present invention eliminates the need for the flood lamps commonly used with chroma replacement technology.

For example, the projected light 64 (comprising the background) creates an exceptionally precise and even illumination of the background image as it reflects off of the retroreflective screen. The uniform precision of the background color results in a narrower bandwidth (frequency) of the color such that we could use a narrower filter to remove the blue screen (or any selected color) from the image with the subject. The ability to remove a narrower band of color is a vast improvement over the prior art, where the uneven illumination caused by the flood lamps and shadows required a much wider bandwidth of background color be removed, resulting in a removal of a wide range of shades of a certain color from the picture. The ability to remove a narrower bandwidth of color allows a more specific shade of a color (or a more precise wavelength) to be removed while leaving other shades of the same color within the foreground image. Each of the above improvements is especially significant in portrait or commercial still-photography where color perfection of the entire image is more critical.

Another advantage provided by the use of a retroreflective screen is the radical reduction of light scattered from the background. In the prior art techniques, the multiple flood lamps used to illuminate a subject and background would have light reflected off the screen behind the subject and on to the subject. This re-reflected (or scattered) light causes a distortion of color on the subject. For example, a green background would cause a green shadow cast on the subject. The retroreflective screen eliminates the scattered light because the screen reflects light in an orthogonal direction, which in the present invention is that light which reflects back along the same optical path as the light projected to the screen. Due to the extreme reflectivity of the screens 40 and 70, only a very minimal amount of light is needed to adequately illuminate the screens, and that light returns directly to the front projection device and camera.

Figure 4:
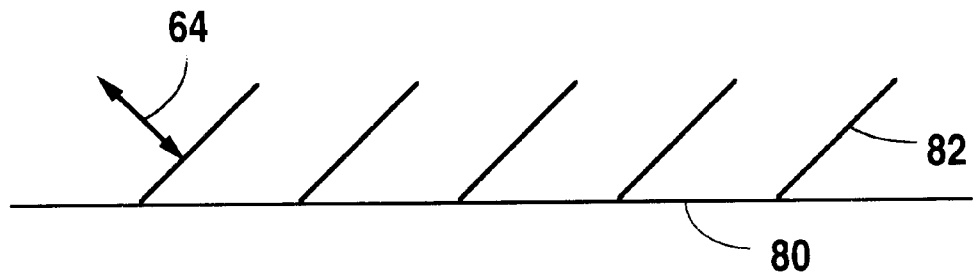
FIG. 4 is a side view of a retroreflective floor panel.

FIG. 4 provides a detailed view of a horizontal retroreflective screen 70. The horizontal screen 70 comprises a base 80 with a plurality of angled slats 82. Individual angled slats 82 are at an angle such that the surface of the slat is approximately perpendicular to the projected light 64. The preferred embodiment of the present invention uses aluminum for the base 80 and for the angled slats 82. The angled slats have a coating of retroreflective material over the slat.

Figure 5:
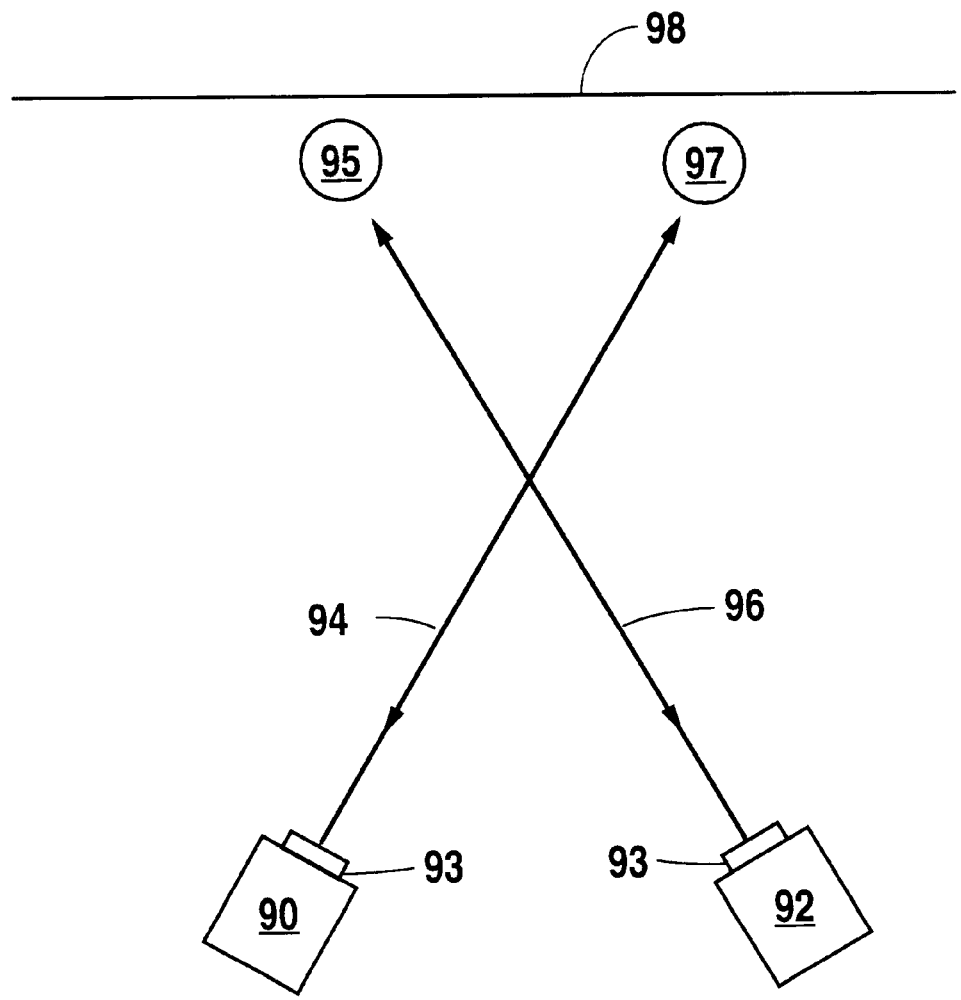
FIG. 5 illustrates the use of the present invention with multiple cameras.

FIG. 5 illustrates an embodiment of the present invention that uses multiple front projection devices 93 coupled to separate cameras, 90 and 92, directed at a single retroreflective screen 98. The present invention allows multiple cameras to simultaneously photograph a scene while using the same or different colored background images and only one retroreflective screen. For example, if subject 97 has a blue tie, the background image for that subject photographed by camera 90 could be green. If subject 95 is wearing a green tie, the background image for that subject photographed by camera 92 could be blue. The projected light of each camera, 94 and 96, reflects off the retroreflective screen 98 and returns along the same optical path directly at the respective camera lens. The background image of camera 90 will be green while the background image of camera 92 will be blue. The different colored backgrounds used simultaneously will not interfere with each other as long as they are being projected from front projection devices positioned at different optical axis's to the retroreflective screen.

The present invention improves the chroma replacement process used in the film and television industries by providing an inexpensive and flexible apparatus and method for generating a blue screen background without a typical blue screen set or studio. The present invention comprises a projection device that further comprises a front projection device and a retroreflective screen. An advantage of the present invention is that it allows a photographer to eliminate the need for both the colored background and the multiple flood lamps to illuminate the colored background.

The elimination of flood lamps solves problems such as uneven illumination of the background, color contamination of the subject caused by the reflection of colored light off the background, and shadows cast by the subject onto the background. The retroreflective screen also makes many different background colors available while only requiring one screen.

Another embodiment of the present invention also makes the use of chroma replacement in commercial photography a feasible possibility. The ability to quickly change the background color allows the photographer to choose the color of the background after learning of the subject's choice of color.

And, another embodiment of the present invention provides an improvement over prior front projection devices. The present invention provides an automatic alignment that eliminates the time consuming adjustment of the camera, beamsplitter and projector required in the prior front projection process. This feature allows the photographer to shift the camera's orientation from horizontal to vertical and vice versa with the front projection device simply turning precisely on the camera lens and maintaining perfect alignment with the camera. Additionally, the present invention provides a front projection device that couples to a camera and is light enough for the photographer to use the present invention without a stand or tripod. The entire assembly can be hand held which greatly increases the flexibility and mobility of the photographer.

I claim:

1. A projection device for video and film photography that couples to a video or film camera and generates a background image for chroma replacement, comprising:
   a front projection device that couples to the camera and generates and projects a uniform single-color background of a color suitable for chroma replacement; and
   a retroreflective screen mounted in front of said front projection device that reflects said single-color background back to the camera to produce a relatively narrow bandwidth of color.

2. The projection device of claim 1 wherein said retroreflective screen comprises a vertically mounted panel.

3. The projection device of claim 1 wherein said retroreflective screen comprises a horizontally mounted panel.

4. The projection device of claim 1 wherein said front projection device further comprises:
   a projector with a removable filter; and,
   a beamsplitter coupled to said projector.

5. A projection device for video and film photography that uses a front projection device coupled to a video or film camera and generates a background image for chroma replacement, comprising:
   a projection means for generating and projecting uniform single-color background of a color suitable replacement, said means projection couples to the camera; and a retroreflective screen that reflects said single-color background back to the camera to produce a relatively narrow bandwidth of color, said screen is mounted in front of said projection means.

6. The projection device of claim 5 wherein said generating and projecting means further comprises:
   a projector with a removable filter; and,
   means for splitting the light of the background image.

7. A method for video and film photography that uses a front projection device coupled to a video or film camera that generates a background image for chroma replacement, comprising the following steps:
   projecting a single-color background of a color suitable for chroma replacement with a projection device that further comprises a front projection device and a retroreflective screen that reflects said single-color background back to the camera to produce a relatively narrow bandwidth of color; and
   receiving said relatively narrow bandwidth of color through said front projection device to the camera for chroma replacement.

8. The method of claim 7 wherein said retroreflective screen comprises a vertically mounted panel.

9. The method of claim 7 wherein said retroreflective screen comprises a horizontally mounted panel.

10. The method of claim 7 wherein said front projection device further comprises:
    a projector with a removable filter; and,
    a beamsplitter coupled to said projector.

11. A method for video and film photography that uses a front projection device coupled to a video or film camera that generates a background image for chroma replacement, comprising the following steps:
    providing a projection device to generate a uniform single-color background of a color suitable for chroma replacement; said projection device further comprises a front projection device and a retroreflective screen that reflects said single-color background back to the camera to produce a relatively narrow bandwidth of color; and
    coupling said front projection device to the camera.

12. The method of claim 11 wherein said retroreflective screen comprises a vertically mounted panel.

13. The method of claim 11 wherein said retroreflective screen comprises a horizontally mounted panel.

14. The method of claim 11 wherein said front projection device further comprises:
    a projector with a removable filter; and,
    a beamsplitter coupled to said projector.

* * * * *

UNITED STATES PATENT AND TRADEMARK OFFICE
CERTIFICATE OF CORRECTION

PATENT NO. : 5,946,500
DATED : 08/31/99
INVENTOR(S) : Oles

It is certified that error appears in the above-identified patent and that said Letters Patent is hereby corrected as shown below:

In the Claims:

Column 7, Line 33, Replace "projecting uniform single-color" with --projecting a uniform single-color--.

Column 7, Line 34-35, Replace "a color suitable replacement" with --a color suitable for chroma replacement--.

Column 8, Line 5, Replace "projecting a single-color background" with --projecting a uniform single-color background--.

Signed and Sealed this

First Day of February, 2000

Attest:

*Attesting Officer*

Q. TODD DICKINSON

*Acting Commissioner of Patents and Trademarks*